United States Patent [19]

Ramming

[11] Patent Number: 4,823,618
[45] Date of Patent: Apr. 25, 1989

[54] FORCE-MOMENT SENSORS

[75] Inventor: John E. Ramming, Woodland, Calif.

[73] Assignee: JR3, Inc., Woodland, Calif.

[21] Appl. No.: 84,878

[22] Filed: Aug. 17, 1987

Related U.S. Application Data

[63] Continuation-in-part of Ser. No. 909,103, Sep. 17, 1986, abandoned.

[51] Int. Cl.⁴ ............................ G01L 5/16; G01L 1/22
[52] U.S. Cl. ............................... 73/862.04; 73/862.65
[58] Field of Search ........... 73/862.04, 862.05, 862.06, 73/862.65

[56] References Cited

U.S. PATENT DOCUMENTS

| | | | |
|---|---|---|---|
| 2,933,921 | 4/1960 | Gloor | 73/862.65 X |
| 3,422,445 | 1/1969 | Jacobson | |
| 4,094,192 | 6/1978 | Watson et al. | |
| 4,398,429 | 8/1983 | Cook et al. | 73/862.04 |
| 4,488,441 | 12/1984 | Ramming | 73/862.04 |

FOREIGN PATENT DOCUMENTS

| | | | |
|---|---|---|---|
| 55-125426 | 9/1980 | Japan | |
| 1145885 | 5/1983 | Japan | |
| 58-94995 | 6/1983 | Japan | |
| 58-205830 | 11/1983 | Japan | |
| 59-205297 | 11/1984 | Japan | |
| 0093933 | 5/1985 | Japan | 73/862.04 |

OTHER PUBLICATIONS

Finonmechanika–Mikrotechnika, vol. 19, No. 10, Oct. 1980, Hungary

Primary Examiner—Charles A. Ruehl
Attorney, Agent, or Firm—Burns, Doane, Swecker & Mathis

[57] ABSTRACT

A force-moment sensor, as an article of manufacture, for detecting and controlling movements of a robot arm, positionable between the arm and a tool wherein a pair of parallel disc or plate members are joined together adjacent their outer peripheries by a plurality of spaced apart unitary bridge elements or members to form a cylindrical chamber between the discs. In one form the ring member between the disc members has formed therein at least three generally circular or polygonal shaped bridge elements, each having a central opening therethrough. Each of the bridge elements extends across a slot extending circumferentially around a portion of and through the ring between the bridge elements, and a pair of slots at each end of and angularly transverse to the circumferential slot to define the circular bridge elements. In another form the two discs have complementary recesses cut at equal intervals in their peripheries to receive one or more platelets welded therein to the discs apart. Preferably, the edges of the platelets are similarly cut to form the bridge element within the platelets and then the edges of the platelets are carved to join the slot between the plates to leave the bridges as the sole connections between the plates. Also disclosed is a method of forming the sensor unit. Strain gages are mounted on the edges or center of the bridge elements to form sensing apparatus for detecting forces and/or moments in any of a plurality of mutually perpendicular directions to permit control of a robot arm and tool.

15 Claims, 3 Drawing Sheets

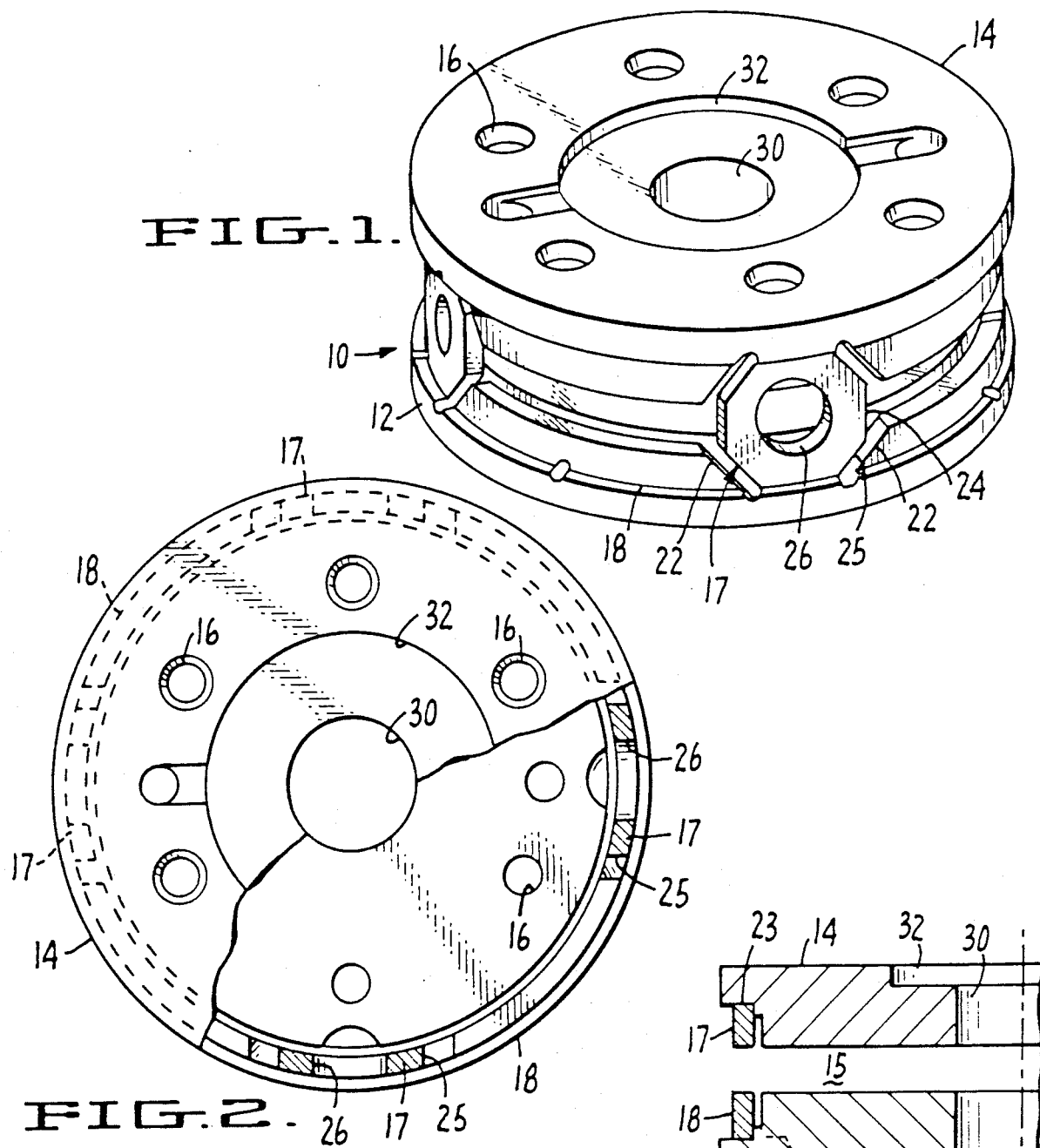
FIG. 1.
FIG. 2.
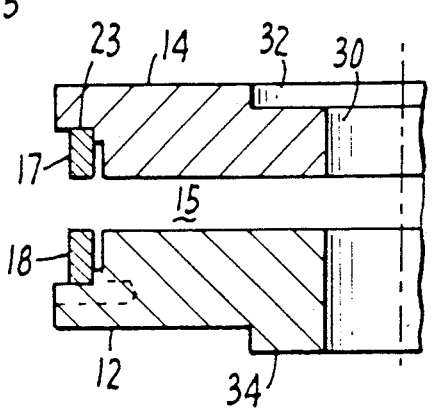
FIG. 4.
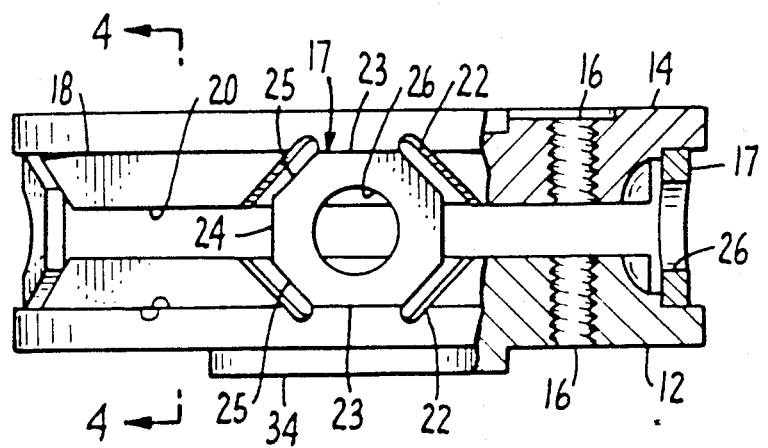
FIG. 3.

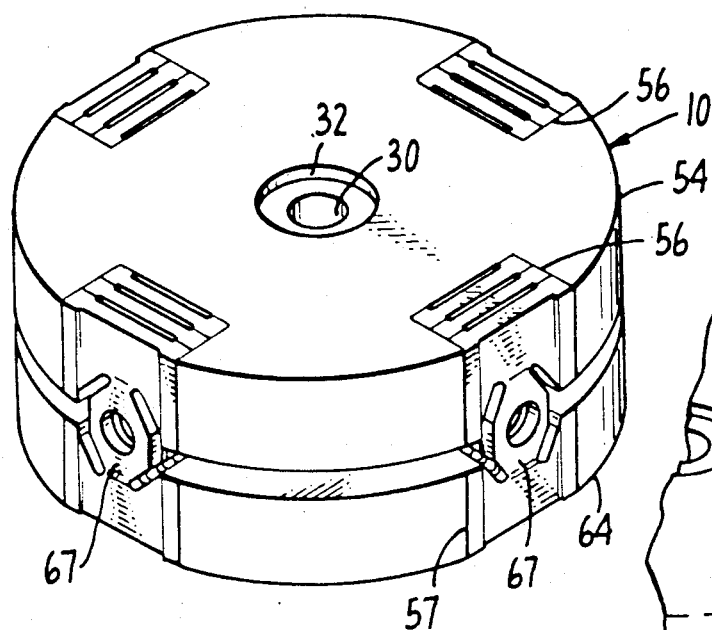
FIG.5.
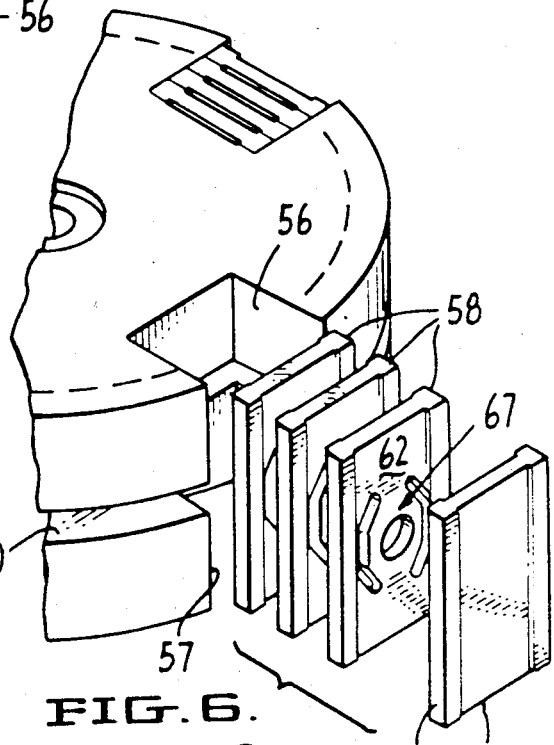
FIG.6.
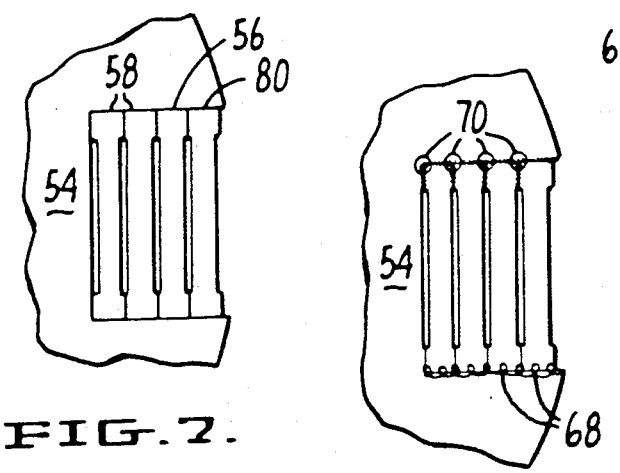
FIG.7.     FIG.8.
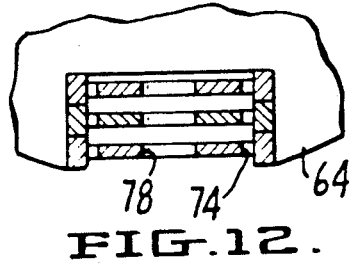
FIG.12.
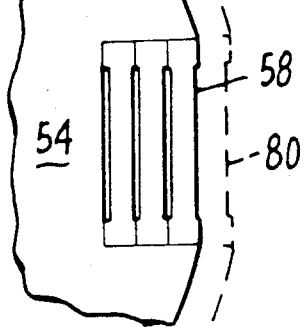
FIG.9.
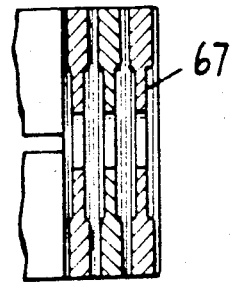
FIG.11.
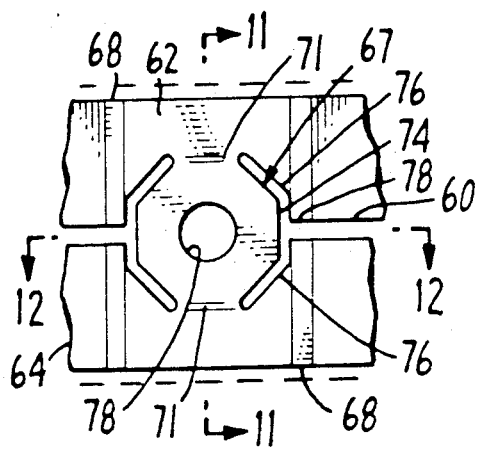
FIG.10.

FORCE-MOMENT SENSORS

This is a continuation-in-part of Ser. No. 909,103 filed Sept. 17, 1986, now abandoned.

BACKGROUND OF THE INVENTION

1. Field of the Invention

This invention relates to a force and moment detecting system. More particularly, it relates to a method of forming a sensor element to detect forces and/or moments, the sensor element as an article of manufacture, and the sensing apparatus formed with such an element. Most particularly, this invention relates to apparatus useful in detecting and measuring forces and/or moments existing between a robot arm and a tool when the tool encounters resistance to movement in any of a plurality of directions. As used herein, a "moment" is a torque, twist or rotary force acting around an axis in any given direction.

It is a particular object of the present invention to provide a force and/or moment sensing element or unit in which a pair of driving and driven plates are joined together by a plurality of bridging elements to which strain gages or force measuring elements may be readily attached and which may be manufactured more simply and uniformly at a substantially reduced cost. In one embodiment, the unit is fabricated by joining a pair of mounting plates together by a single peripheral ring member. The plates are either separately manufactured, or one may be formed as a cup by including the ring. Each of the plurality of bridge elements is then milled or cut by conventional milling and cutting procedures to carve slots in the ring to leave a plurality of generally circular bridge elements equally spaced apart circumferentially around the periphery as the only connections between the plates. In another embodiment the circular or cylindrical plates are formed with equally spaced axial notches in the periphery and one or more bridge elements are fused or welded in the notches to form an integral unit with the plates spaced apart and parallel to each other. Alternatively, a single cylindrical block may be carved by electron beam erosion to form the equally spaced bridge elements adjacent the periphery of the so-formed plates.

Preferably, the bridge elements are polygonal in shape to provide surfaces substantially perpendicular or angled to the two plates for mounting strain gages or other force sensing devices either on the edges of the bridge element, or on the circular surface of a central hole through the bridge elements.

2. Prior Art

In automatically controlled apparatus, particularly robot systems, it is highly desirable to detect and control operations of the robot arm carrying a work tool. It has been found particularly useful to detect the forces and moments when the tool, carried by the driven side of the arm, encounters a workpiece, so that "feel" may be imparted to the drive mechanism. This is essential to avoid destruction of the arm, tool, or any object (including humans) that is within its range of motion. Additionally, such feel permits the work tool to follow the contour of objects or articles. A particular example is the problem presented by the need to control a deburring or sanding tool to follow the contour of a casting or molding to remove flashing, burrs, and the like for surface finishing. Such tools require continuous and precise measurement of the forces and/or moments to be most effective for versatility and precision in guiding the work arm and tool to produce a fully finished article.

In such a work environment it is also important that the structure measuring the forces be constructed so that the tool will resist contamination by dust or particles generated during grinding, milling, or sanding the workpiece. It is particularly important in robotic manufacturing that the detecting unit continue to measure accurately such forces and moments even with a considerable amount of contamination caused by particles or debris around the sensing elements.

It has been known heretofore to measure forces and moments and, through feedback, to use such measurements to control a drive mechanism. Such results have been obtained through the use of individual measurements of axial forces with standard measuring load cells, such as those shown in Japanese Pat. No. 55-125426, wherein a plurality of pressure-sensitive conductive rubber plates, laminated with electrode plates, measures the direction and intensity of a grasping element.

An article in *Finommechanika-Microtechnika* (Hungary) Vol. 19, No. 10, October, 1980, discloses a 6-component force meter interposed between the driven and driving members of a robot arm to measure digitally multi-component forces and torques.

U.S. Pat. No. 4,094,182 - Watson et al., discloses driving and driven plates coupled together by three vertical posts equally spaced around the periphery of the unit. Each post carries strain gages. While the unit is useful in detecting forces and moments, it is limited in its overall sensitivity to detect and measure such forces and moments about three mutually perpendicular axes.

Japanese Pat. No. 1145885 discloses a device for measuring forces between a driven member and a driving member. Four cantilever beams at right angles to each other extend radially outwardly from an internal cylinder forming one member. A concentric collar forming the other member is connected to the end of each cantilever beam through three connecting rods mounted in four slots cut axially and as sectors in one end of the concentric collar. Strain gages are mounted on four sides of each radial cantilever beam. Each of the connecting rods and cantilever beams appears to be a separate element requiring multiple assembly steps, similar to the Watson et al. patent.

Japanese Application (Kokai) No. 58-94996 discloses a device for measuring axial torque between two shafts. A center flange and a peripheral ring are connected together through a plurality of radial strain rods. A strain gage is mounted on each rod. The arrangement is also an assemblage of independent elements.

Japanese Application (Kokai) No. 58-205830 discloses a thin-plate force sensor as a substitute for three axial posts between driving and driven members, as in the Watson et al. disclosure. The sensor plate is formed from a circular plate, cut as an asteroid to form six radial cantilever arms. Strain gages are mounted on surfaces of each arm. The individual parts require separate manufacture and assembly.

Japanese Application (Kokai) No. 59-205297 discloses another arrangement of a force detecting device in which a pair of parallel ring plates is connected through four axial pillars and four equally spaced L-shaped beams. The perpendicular sides of the L-shaped beams carry strain gages, and one leg of each "L" is pinned to a driven shaft; the other leg of each "L" is secured to one of the rings driven through the pillars and the other ring. The elements are clearly manufactured separately and then assembled.

In my U.S. Pat. No. 4,488,441, there is disclosed an apparatus for simultaneously measuring perpendicular forces and moments in which equally spaced arches, or horseshoe-shaped units, bridge the space between the two plates. Such generally arch-shaped connecting members are preferably milled from a solid metal block. A center space between the two plates is likewise milled from the block so that the bridging units are integral with the driving and driven plates. To cut the bridging elements in the block in such an arrangement, it is essential that a sector of the plate be cut along mutually perpendicular faces parallel to the common axis of the two plates, so that the faces of the bridging elements are parallel to the unit axis and join the plates along faces radial to the unit axis.

As particularly distinguished from prior art units, the present method provides a simplified method of manufacturing a force-moment sensing unit which is substantially easier to manufacture on conventional machine tools, including automatic lathes, milling machines, drill presses or using electron beam machining and welding. This results in the bridging elements being made integral with the parallel plates so that they are sturdier and more uniformly positioned. Further, the bridging units are so disposed and configured that the mounting of single or multiple strain gages on each bridge is substantially simplified in terms of assembly and reliability. However, most importantly, the greater symmetry of the bridge elements about the circular driving and driven plates of the so produced sensing unit substantially improves performance of the measuring system. In particular, such greater symmetry reduces non-linearities in deflection or strains detected by each bridge when three-dimensional forces or moments are imposed between the plates. Additionally, the structure is better able to resist contamination by particles or debris generated by a robotic work tool such as those fed in welding, grinding, sanding, or cutting operations. This substantially improves and extends the useful life and reduces service necessary to keep a robot arm in operation on a manufacturing or production line to permit 24-hour operation of the robot arm over extended periods of time.

BRIEF SUMMARY OF THE INVENTION

In accordance with one important aspect of the present invention, the force-moment sensor is an article of manufacture which includes a pair of parallel plates or disc members joined together adjacent to their outer peripheries by a plurality of bridging elements. In one form the bridging elements are formed in a unitary ring member joining the plates together so that they are parallel and spaced apart to form a cylindrical chamber between the discs. The ring member is then carved, or milled to form therein at least three generally circular or polygonal-shaped bridge elements, each having a central opening therethrough. Each of these bridge elements is formed by a slot extending circumferentially around a portion of and through the ring between said bridge elements and a pair of slots at each end of and transverse to the circumferential slot to define the circular shape.

In another embodiment, the bridge elements are separately formed from generally rectangular platelets which are welded as by an electron-beam into notches equally spaced around the periphery of the parallel cylindrical plates or discs. The rectangular platelets so welded space the opposing faces of the plates apart and radially parallel to each other. A circumferential slot is thus formed between the plates which extends between the bridge elements. In a preferred form, each bridge element may include one or more parallel platelets. The central portion of the bridge element is then formed as a circular bridge section by a pair of transverse slots formed through the edges of the bridge platelet as a continuation of the circumferential slot between the cylindrical plates.

In a further aspect of the invention, there is provided a method of manufacturing a force and/or moment sensor unit with conventional machine tools which includes:

(a) forming a cup member having a relatively thin side wall extending perpendicular to a circular or cylindrical base plate;

(b) welding or bonding a circular or cylindrical cover plate member of substantially the same diameter and configuration as the cup base which is substantially perpendicular to the open end of the side wall to enclose a cylindrical space between the cup base and cover plate;

(c) cutting a plurality of circumferential slots through the central portion of the cup side wall to form a plurality of equally and circumferentially spaced apart bridge members between the circular plates, the width of each of said slots being narrower than the axial length of said ring;

(d) laterally relieving the ends of the circumferential slots adjacent to the bridge members by forming slots extending at an angle away from the ends of said circumferential slots to at least the edge of said plates;

(e) centrally drilling each of said bridge elements with a circular opening to form a generally circular configuration; and (f) forming mounting means in the external faces of said cover and base plates for mounting said unit between driven and driving members.

The foregoing machine steps may also be performed by electron beam drilling or milling to lo form the desired unitary force and/or moment measuring article from a single metal cylinder.

In accordance with a third aspect of the present invention, there is provided improved apparatus for measuring forces and/or moments between driving and driven units, such as a robotic arm relative to a plurality of mutually perpendicular axes. The apparatus comprises a pair of substantially parallel plates adapted to be mounted between a driving unit and a driven unit. The parallel plates are aligned with such units by mounting means formed on the outer faces of the plates. The plates are held parallel by at least three, equally spaced apart, bridge elements joined to the opposing faces of the plates at their periphery. Each of the bridge elements is relatively thin and generally circular, or polygonal, in form. In one form, a plurality of bridge elements are arranged to be substantially radially parallel and adjacent to each other at the outer edges of the circular plates, with diametrically opposing edges of the bridge elements integral and perpendicular to the adjacent or opposing faces of the plates. A pair of diametrically opposed surfaces on the edges of the elements transverse to the unit axis to form mounting surfaces for strain gage means.

Further objects and advantages of the present invention will become apparent from the following detailed description of the preferred embodiments taken together the drawings, which form an integral part of this specification.

BRIEF DESCRIPTION OF THE DRAWINGS

FIG. 1 is a perspective view of the force-moment sensor of the present invention.

FIG. 2 is a plan view, partially in section, of the force-moment sensor unit of FIG. 1.

FIG. 3 is an elevation view, partially in section, of the force-moment sensor unit of FIG. 1.

FIG. 4 is an elevation view, partially in section, taken in the direction of arrows 4—4 in FIG. 3.

FIG. 5 is a perspective view of an alternate form of the force and/or moment sensor element particularly constructed for transfer of greater forces or moments as between the actuated and actuating means of a robot arm, through a plurality of radially spaced and parallel bridge elements.

FIG. 6 is a partially exploded view showing the assembly of multiple parallel platelets having the bridge elements performed therein, as shown in FIG. 5.

FIG. 7 is a partial plan view of the sensor unit of FIGS. 5 and 6 showing one set of bridge platelets assembled within a disc mortise or cavity before welding.

FIG. 8 is a view similar to FIG. 7 showing individual welds to secure the bridge platelets in the mortises or cavities at the peripheral edges of the driving and driven plates.

FIG. 9 is a partial plan view similar to FIG. 8 showing removal of the outermost bridge element by machine turning the combined plates and bridges.

FIG. 10 is a partial side elevation view of one of the completed bridge elements showing slotting of the edge of the platelets to complete isolation of the driving and driven plates from each other except through the spaced apart bridge members.

FIG. 11 is a side elevation view taken in the direction of arrows 11—11 of FIG. 10 showing in cross-section a preferred configuration of the three parallel bridge members after assembly.

FIG. 12 is a partial plan view taken in the direction of arrows 12—12 particularly showing in cross-section the center of the bridge elements.

DETAILED DESCRIPTION OF THE PREFERRED EMBODIMENTS

Figure 13:
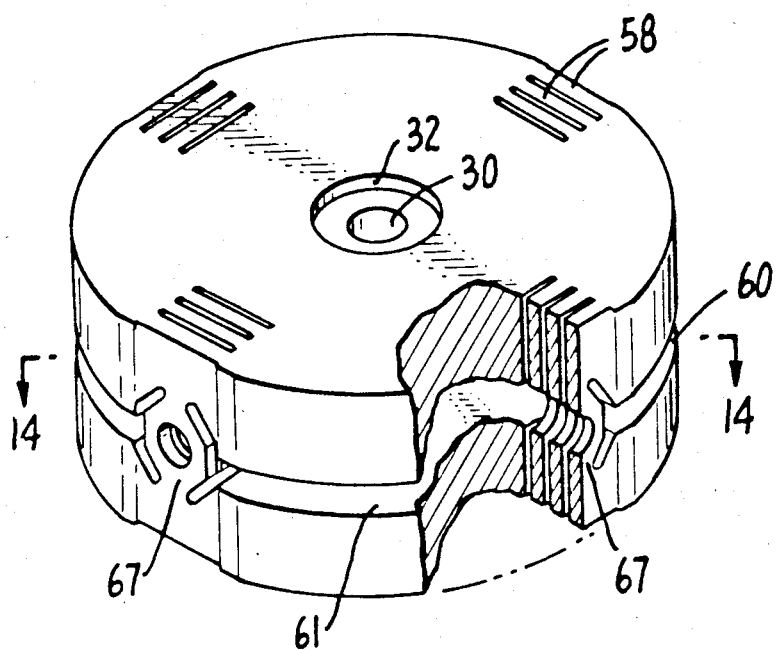
FIG. 13 is a perspective view similar to FIG. 5 showing a portion of the discs or plates and bridge members cut-away to show final assembly.

Referring now to the drawings, and in particular to FIG. 1, the force and/or moment sensor element 10 comprises a pair of circular or cylindrical plates 12 and 14, which may interchangeably be either the driving or driven plates between a robot arm and a tool manipulated by the arm. Detector-sensor element 10 may be secured to such apparatus by the mounting holes 16 formed in both top and bottom plates 12 and 14 as viewed in FIG. 1.

For detection of forces and moments acting between plates 12 and 14 in any of a plurality of perpendicular directions, it is essential that the assembly by capable of carrying the driven load while measuring differences in forces and/or moments between the driving and driven plates. Thus, the sensing points or deflection areas of the detecting elements must be sufficiently rigid to have adequate torque- and force-carrying capacity without undue bending or flexure of the sensing elements under such loads. Accordingly, it is important that the octagonal bridge or connecting elements 17 be substantially identical and formed integral with driving and driven plates 12 and 14. As indicated in the present embodiment, for both strength and uniformity in the structure of unit 10, bridge elements 17 may be either polygonal or substantially circular. Further, to simplify force and moment measurements in any given direction, it is essential that at least three elements 17 be equally spaced circumferentially around and between the periphery of the two rings. As shown in the present embodiment, the four bridge elements 17 are equally spaced apart at 90°. It will be understood that any three or more bridges are satisfactory for detecting forces and/or moments in any three or more perpendicular directions relative to both the axis and circumference of unit 10.

While the foregoing requirements for the bridging elements and their relationship to plates 12 and 14 has been known heretofore, uniformly locating and maintaining the plates parallel to each other has been difficult to achieve. This is due to the need to form the interior of sensor unit 10 as an open cylinder, with no intermediate connections. To provide a substantially cylindrical hollow space between the two plates with adequate strength and rigidity in the bridge elements to carry the loads between the plates. The outer periphery of the unit requires a milling or cutting operation which will leave the bridge elements intact while removing all intervening material. Alternatively, it is necessary to individually weld each bridge member at selected positions between the periphery of the two plates. Neither of these methods of fabrication has been satisfactory either as to symmetry of the sensor unit or uniformity of the bridges, so that forces and moments between the two plates may be uniformly detected by the bridge elements, independent of their location. Accordingly, calibration and data reduction from measurements made with each sensor unit has been difficult and expensive.

In accordance with the present invention, in one form these problems have been solved by forming the two plates either as individual plates, or by forming one of the plates with an up-standing wall so as to form a cup member having a relatively thin cylindrical side wall. Such a structure is best seen in FIGS. 2 and 4 where plates 12 and 14 are joined together by a single ring member 18. Ring 18 is uniformly bonded, as by electronic welding, around the outer periphery of plates 12 and 14. It will be understood that the width, or axial length, of ring 18 may be selected in accordance with the intended service of unit 10. In particular, where plates 12 and 14 are quite close together, ring 18 may be formed integral with bottom plate 12, using a lathe or drill press to cut or drill a cylindrical block to shape plate 12 and ring 18 as an integral cup. Where plates 12 and 14 are more widely spaced, a separate ring 18 is first welded to plate 12.

In either arrangement, plate 14 is then joined, as by electronic welding, to the open end of the cup member or to the opposite end of ring 18. This forms the base structure including the enclosed cylindrical chamber 15 for the force-moment sensor of the present invention.

With ring 18 and plates 12 and 14 so formed, circumferential slots 20 are then cut through the central portion of ring 18 to leave four bridging elements 17 equally spaced circumferentially from each other at 90°. While circumferential slots 20 may be the full width of ring 18, preferably for stiffness, slots 20, as shown, are on the order of one-half the width of ring 18. To shape bridge elements 17 in ring 18, four lateral slots 22 are then milled at the ends of each the circumferential slots 20. These extend generally axially and at an angle relative to circumferential slots 20 so that they extend from circumferential slots 20 onto the edge of plates 12 and 14. This forms a generally octagonal shape around the sides of bridge 17. Edges 23 of bridge 17 are secured to the opposing parallel faces of plates 12 and 14. Obviously, the form of bridge 17 may be circular or any other polygonal shape. Each of these external forms is hereinafter referred to a "generally circular."

Figure 14:
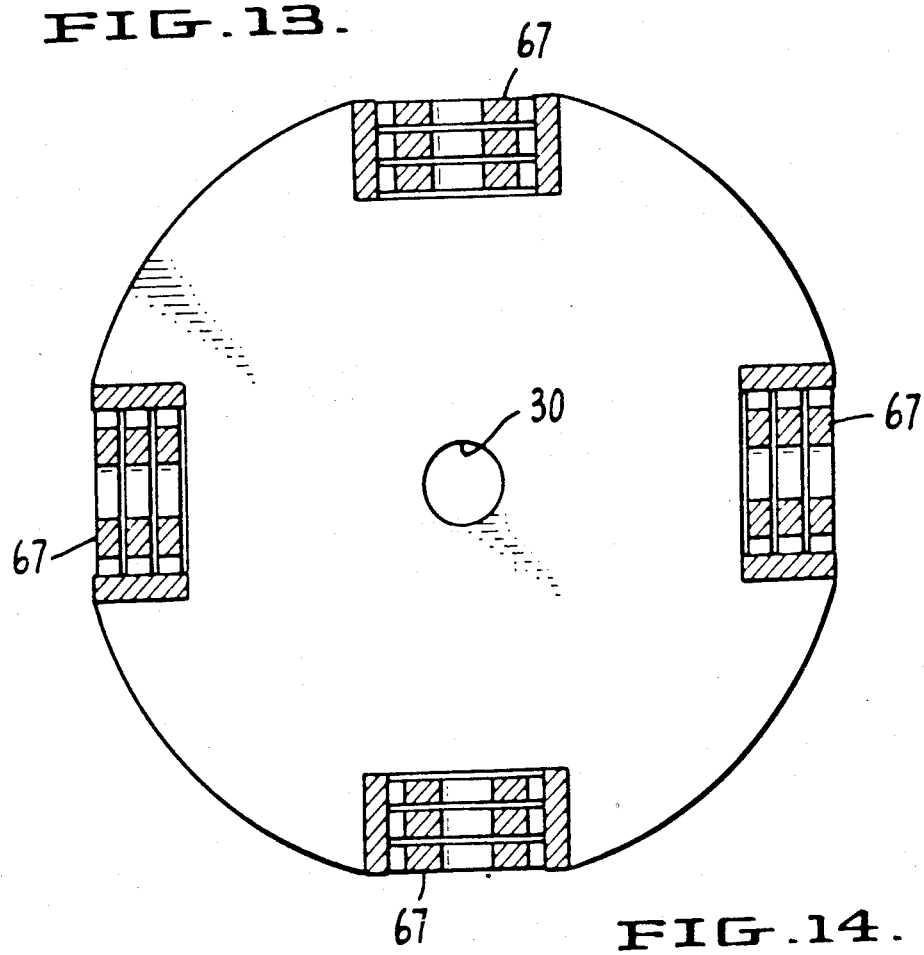
FIG. 14 is a cross-sectional plan view of the lower disc and bridge members taken in the direction of arrows 14—14 of FIG. 13.

A further embodiment of the invention particularly suitable for carrying greater forces and moments through the sensor unit is disclosed in FIGS. 5-14, inclusive. In such an arrangement, force and/or moment sensing unit 10 may be formed by two generally circular plates or discs 54 and 64 which are spaced axially from each other by platelets 58 bonded in complementary recesses or slots 56 and 57, respectively in plates 54 and 64. As indicated, recesses 56 and 57 are equally spaced apart circumferentially. In this embodiment, each pair of recesses are deep enough to provide space for four platelets 58 that are slightly longer than the combined overall width of discs 54 and 64. In this way, when platelets 58 are assembled, to extend to the outer facing surfaces of discs 54 and 64 they form circumferential slots 60 and open cylindrical volume 61 between the two plates. Final assembly of stacked platelets 58 is shown in FIG. 7 prior to welding. As indicated in FIG. 8, the outer edges of plates 58 are formed as flanges 68 which are joined to the sides of recesses 56 and 57 as by electron beam welding. This may be performed by a beam penetrating from the outer surfaces of either plate 54 or 64 to their inner surfaces adjacent circumferential slots 60.

As best seen in FIG. 10, three of the platelets 58 are formed with a substantially circular or octagonal bridge element 67 carved or milled in the central portions 62, in the same manner as those formed in the embodiments of FIGS. 1 to 4. Desirably, central portion 62 is thinner than flanges 68 to assure radial spacing between bridge elements 67 after assembly. Similarly to the configuration of the FIG. 1, axially-extending edge portions 74 of bridge element 67 are axially parallel to the plates of unit 10 while canted edges 76 diverge laterally from center slots 78 through flanges 68. As shown, slots 78 are continuous with circumferential slots 60 so that bridge elements 67 isolate discs 54 and 64 from other connections.

As best seen in FIG. 6, three individual platelets are parallel, and abut each other, radially. Blank platelet 80 preferably covers the three bridge elements previously carved in platelets 58. Plate 80 maintains parallelness of all four platelets before they are electronically welded to form a single integral unit with discs 54 and 64. Desirably, platelets 58 and 80 are bonded as by a single electron beam pass, along edges of flanges 68 to the sides of recesses 56 and 57. After such bonding the entire assembly may be turned, as in a lathe, to remove the outer circumference of the plates 56 and 64 deep enough to eliminate platelet 80, as shown in phantom by FIG. 9.

Desirably, after welding the abutting platelets into the recess mortises or cavities, as in FIG. 8, any connections between individual platelets 58 are relieved as by drilling either mechanically or electronically, by electron beam or electron erosion, to form holes 70. This isolates each of the individual platelets 58 carrying bridge elements 67 from the adjacent parallel elements and leaves only edges 71 of the three bridge elements forming bridge member. Final assembly of the unit constructed in accordance with FIGS. 5-10, is shown in cross-section by FIGS. 13 and 14.

In addition to the arrangements shown in the drawings, units according to the present invention may be formed by electron beam cutting from a single solid cylindrical body. In such an article a cylinder, of the same general dimensions as the fabricated sensor units shown in FIGS. 1 or 5, is transversely drilled to form a continuous slot extending through the center of the body so that metal is left only where the equally spaced bridges are desired. Such cutting may be done by drilling single holes through such central space. The circumferential slot is then formed extending either diametrically across the cylinder block or to cut individual sectors in a rectangular pattern to form the opposing faces of the central cylindrical cavity within the body. The individual circular bridge elements are then cut as by drilling or milling through the interconnecting bridge material either by conventional machine operations or by electronic drilling or erosion.

For convenience in mounting strain gages on the external surfaces of bridge 17 or 67, canted edges 25 and central edge 24 of bridge 17 of FIG. 1 may be cut with a smooth or finished surface to permit easy bonding of the strain gages thereto (not shown). Similarly, the center of each bridge element 17 or 67 may be drilled as by circular hole 26, or 78 to form an additional internal mounting surface for strain gages. Hole 26 makes possible insertion of a plug member (not shown) to carry a strain gage assembly. Obviously, by proper temperature control, hole 26 may be expanded or contracted to bond such gages effectively to the inner surface of hole 16. This permits the strain gages to move with the bridge element for the purpose of detecting minute stress or strain movements of the individual sensors in each of the circumferentially spaced bridge elements.

For the purpose of aligning sensor elements, such as strain gages with a driving member of a robot arm and driven member for robot tool support, the center of the two discs may be drilled, as by aligned central bore 30. Additionally, the outer faces of plates 12 and 14 may be formed with key slots 32, in plate 14, and key slot 34 on plate 12, to assist in proper alignment of the sensor unit with the driving and driven members of the robot. Further, as indicated particularly in FIG. 3, holes 16, for mounting sensor unit 10 between the tool and the arm, are alignable with connecting bolts or studs of the robot tool and arm. In this way, the operating configuration of the tool and arm is little changed, except for the width of the sensor unit which may add 1 to 3 inches to the operating length of the arm. Further, such a structure makes possible the location of electrical connections and leads from individual strain gages mounted on the outer surface of bridge 17, as on axial edges 24, or the inner surface of hole 26, so that all such leads pass through center bore 30. These leads may then connect through the center of a robot arm to individual measuring and control circuitry responsive to forces and/or moments sensed by the unit. Thus, the electrical connections need not be through external wiring harnesses that could be entangled by the arm or tool. Further, by such construction, the detector element does not require additional protection, apart from normal flexible sleeving or booting, around the detector itself. It also permits the entire assembly of the sensor unit to be enclosed by a metal shell or can (not shown). This is particularly significant in that it permits the sensor unit to be used in normal operating environments where dust and dirt particles are generated by the tools in welding, grinding, milling, and boring, or in mechanical abrading or sanding of parts. Thus, the unit of the present invention is able to tolerate such work debris without separately protecting the strain gage elements.

Because of the uniformity and the symmetry of the individual bridge elements 17 formed by the present construction, it has been found possible to detect deflections on the order of a few millionths of an inch at the working tool carried by sensor unit 10. This permits the robot to be programmed to follow the contours of mass-produced articles with a minimum of computer programming and a high degree of "feel" for pressure between the tool and the workpiece. Such feel permits exceedingly fine finishing work, such as the removal of flashing from plastic molded parts. Such finishing is accomplished without damage to the surface of the workpiece, such as a chair arm, and without leaving unacceptable amounts of flashing on the article. This substantially reduces hand labor to complete the work and improves the "yield" of the work.

From the foregoing description, various modifications and changes will occur to those skilled in the art, both as to the method of manufacture of the sensor element, as well as in the sensor element configuration itself. Additionally, it will be understood that the sensor apparatus which incorporates the present sensor unit, including the location of individual strain gages to form the sensor unit into force and/or moment sensing apparatus, may be modified without departing from the invention. All such modifications and changes coming within the scope of the appended claims are intended to be included therein.

I claim:

1. An article of manufacture for use as a multiple force and/or moment measuring element of a force-moment sensor unit, including a pair of parallel disc members joined together adjacent to the outer periphery of said discs by a plurality of circumferentially spaced bridge elements to form a hollow cylindrical chamber between said discs, each of said bridge elements being spaced from each other circumferentially around the periphery of said discs to thereby hold said discs generally parallel to each other and form a slot extending circumferentially between each of said bridge elements, and each of said bridge elements having a pair of transverse slots formed in the edges thereof extending generally transverse to the adjacent ends of said circumferential slot to define a generally circular load carrying member in each of said bridge elements for transmitting forces and moments between said parallel disc members.

2. An article in accordance with claim 1 in which said circular load carrying member of each of said bridge elements includes at least one surface generally perpendicular to said circumferential slot and generally radial to the central axes of said disc members.

3. An article in accordance with claim 2 in which each of said circular load carrying members includes a pair of diametrically opposed surfaces formed on the edges thereof.

4. An article in accordance with claim 3 in which said diametrically opposed surfaces are on central opening through said circular load carrying member.

5. An article of manufacture in accordance with claim 1 in which said circumferential slots extend radially and laterally between said parallel discs so that the attached ends of said bridge elements are the sole connection between said discs.

6. An article in accordance with claim 1 in which four bridge elements are equally spaced circumferentially around said parallel disc members.

7. An articles in accordance with claim 1 wherein each of said circumferential spaced bridge elements includes at least another bridge element parallel and radially adjacent thereto.

8. An article in accordance with claim 7 wherein said parallel bridge elements includes a second parallel and radially adjacent bridge element.

9. An article in accordance with claim 1 in which each of said discs includes a plurality of mounting means parallel to the axis of said disc, said mounting means being formed radially inwardly from said bridge elements and circumferentially spaced apart on the outer surface of said disc.

10. An article in accordance with claim 1 in which each of said discs includes a plurality of holes equally spaced radially from the axes and through said discs for mounting said unit between two axially aligned mounting surfaces.

11. A force-moment measuring unit for detecting forces and/or moments in a plurality of mutually perpendicular directions between a driving element and a driven element comprising a pair of substantially parallel circular plates adapted to be mounted between a driving plate and a driven plate; said plates being adapted for alignment therewith by mounting means formed on each of said plates; said parallel plates being joined together at their periphery by at least three equally spaced apart bridge elements, each of said bridge elements being a relatively thin and generally circular disc with diametrically opposed edges integral with adjacent faces of said plates, and the disc faces of said bridge elements substantially parallel to the axes of said plates, the edges of said discs extending between said plates including at least a pair of diametrically opposed mounting surfaces with strain gage means secured to said mounting surfaces of each bridge element for the detection of forces and/or moments between said driving and driven plates.

12. A force-moment measuring unit in accordance with claim 11 wherein each said bridge element includes a circular opening through the center of said disc.

13. A force-moment measuring unit in accordance with claim 11 wherein four bridge element discs are equally spaced circumferentially around the periphery of said parallel plates.

14. A force-moment measuring unit in accordance with claim 11 wherein each of said bridge elements includes a plurality of parallel discs radially adjacent each other and axially integral with the adjacent faces of said plates.

15. A force-moment measuring unit in accordance with claim 14 wherein each of said plurality of parallel discs includes a coaxial circular opening through the center thereof.

* * * * *